United States Patent [19]

Moore

[11] Patent Number: 4,843,904
[45] Date of Patent: * Jul. 4, 1989

[54] WORK POSITIONER

[75] Inventor: L. Bruce Moore, Moline, Ill.

[73] Assignee: Machine Research Company, Rock Island, Ill.

[*] Notice: The portion of the term of this patent subsequent to Mar. 31, 2004 has been disclaimed.

[21] Appl. No.: 928,793

[22] Filed: Nov. 10, 1986

Related U.S. Application Data

[63] Continuation of Ser. No. 821,693, Jan. 23, 1986, Pat. No. 4,653,739.

[51] Int. Cl.$^4$ ............................................. F16H 55/24
[52] U.S. Cl. ....................................... 74/396; 74/409; 74/411.5; 74/425
[58] Field of Search ................... 74/411.5, 425, 380, 74/409, 396, 406, 813 L, 822

[56] References Cited

U.S. PATENT DOCUMENTS

| | | | |
|---|---|---|---|
| 2,348,391 | 5/1944 | Kester | 74/396 |
| 2,419,887 | 4/1947 | Disse | 74/396 |
| 2,687,046 | 8/1954 | Vorech | 74/522 |
| 2,771,169 | 11/1956 | Wahlstrom | 74/396 |
| 3,202,015 | 8/1965 | Moul, Jr. et al. | 74/425 |
| 3,463,030 | 8/1969 | Nuccel | 74/396 |
| 4,040,307 | 8/1977 | Koster | 74/425 |
| 4,149,430 | 4/1979 | F'Geppert | 74/411.5 |
| 4,586,393 | 5/1986 | Mooney et al. | 74/425 |
| 4,621,933 | 11/1986 | Musso | 74/425 |
| 4,643,038 | 2/1987 | Byram | 74/425 |
| 4,653,739 | 3/1987 | Moore | 74/411.5 |

FOREIGN PATENT DOCUMENTS

| | | | |
|---|---|---|---|
| 317234 | 12/1956 | France | 74/380 |

*Primary Examiner*—Allan D. Herrmann
*Attorney, Agent, or Firm*—Lockwood, Alex, FitzGibbon & Cummings

[57] ABSTRACT

A work piece positioning device which has a table upon which the work piece is supported is disclosed. The table is rotatably mounted on a sub-assembly which is tiltably mounted on a frame such that the work piece can be positioned in any desired predetermined attitude. Two worm gear systems are utilized for positioning the table, one for the rotating action and one for the tilting action. Each worm gear system has a worm gear, a tiltable worm and a locking mechanism. Once the table and work piece are in the desired predetermined attitude, the locking mechanisms are actuated, locking each worm to its respective worm gear.

2 Claims, 5 Drawing Sheets

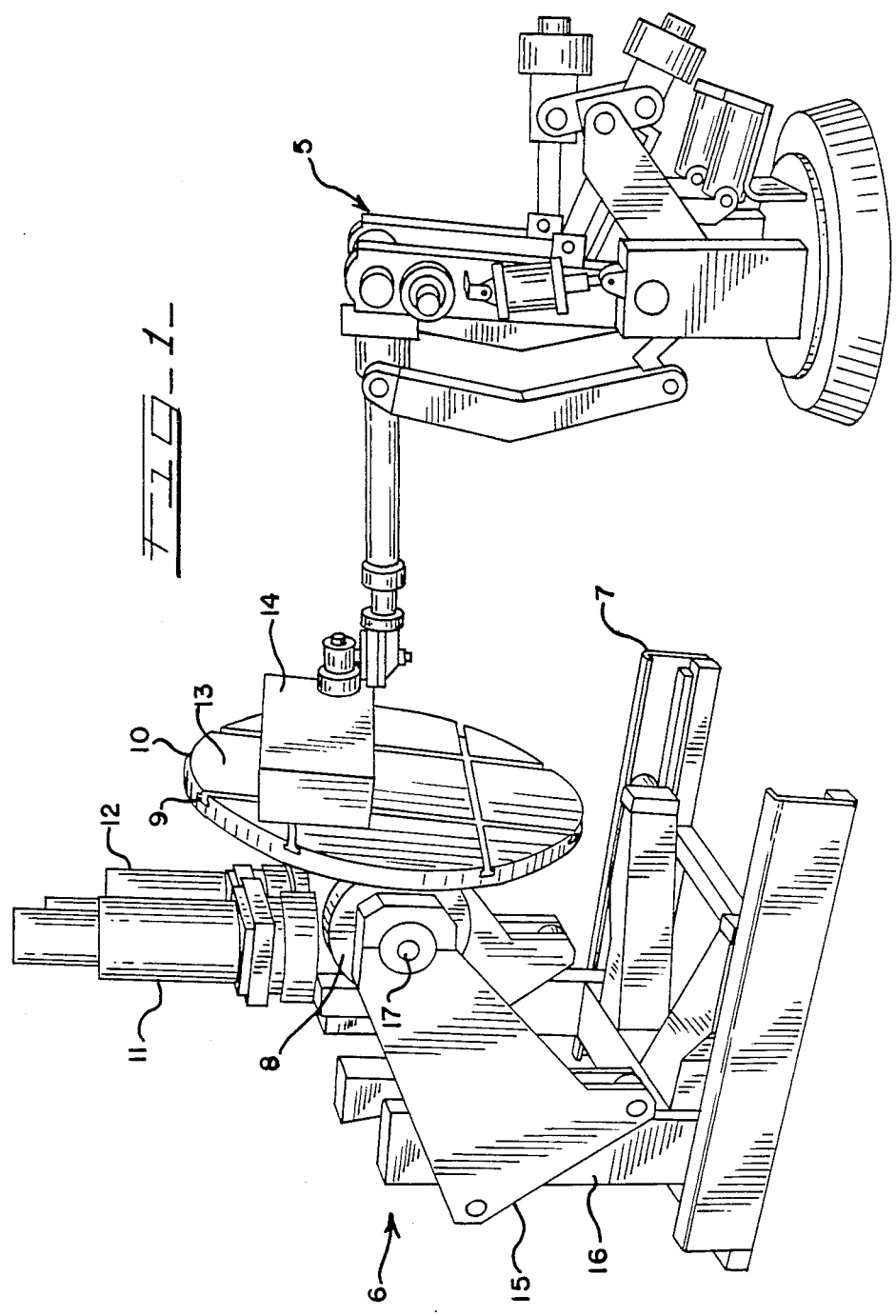

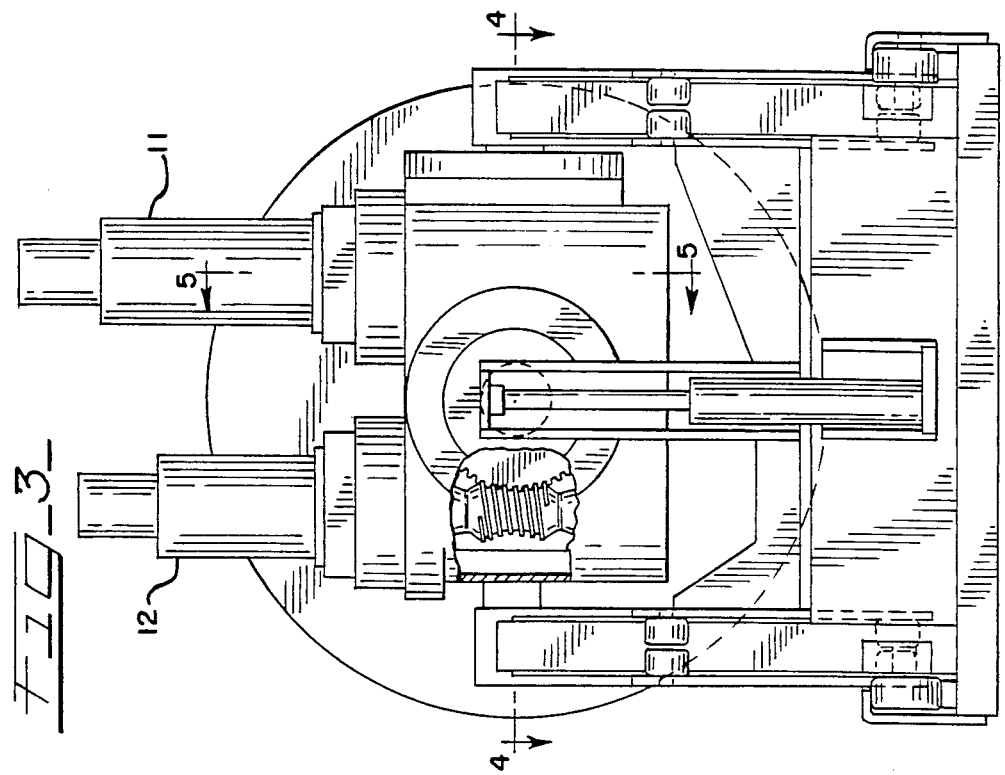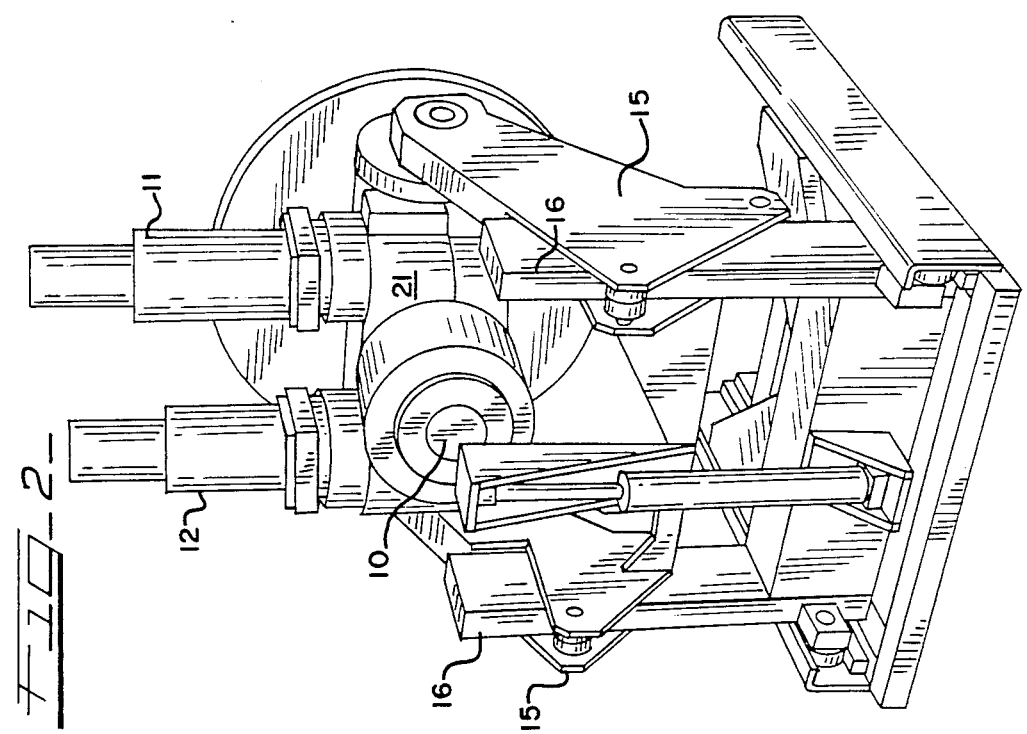

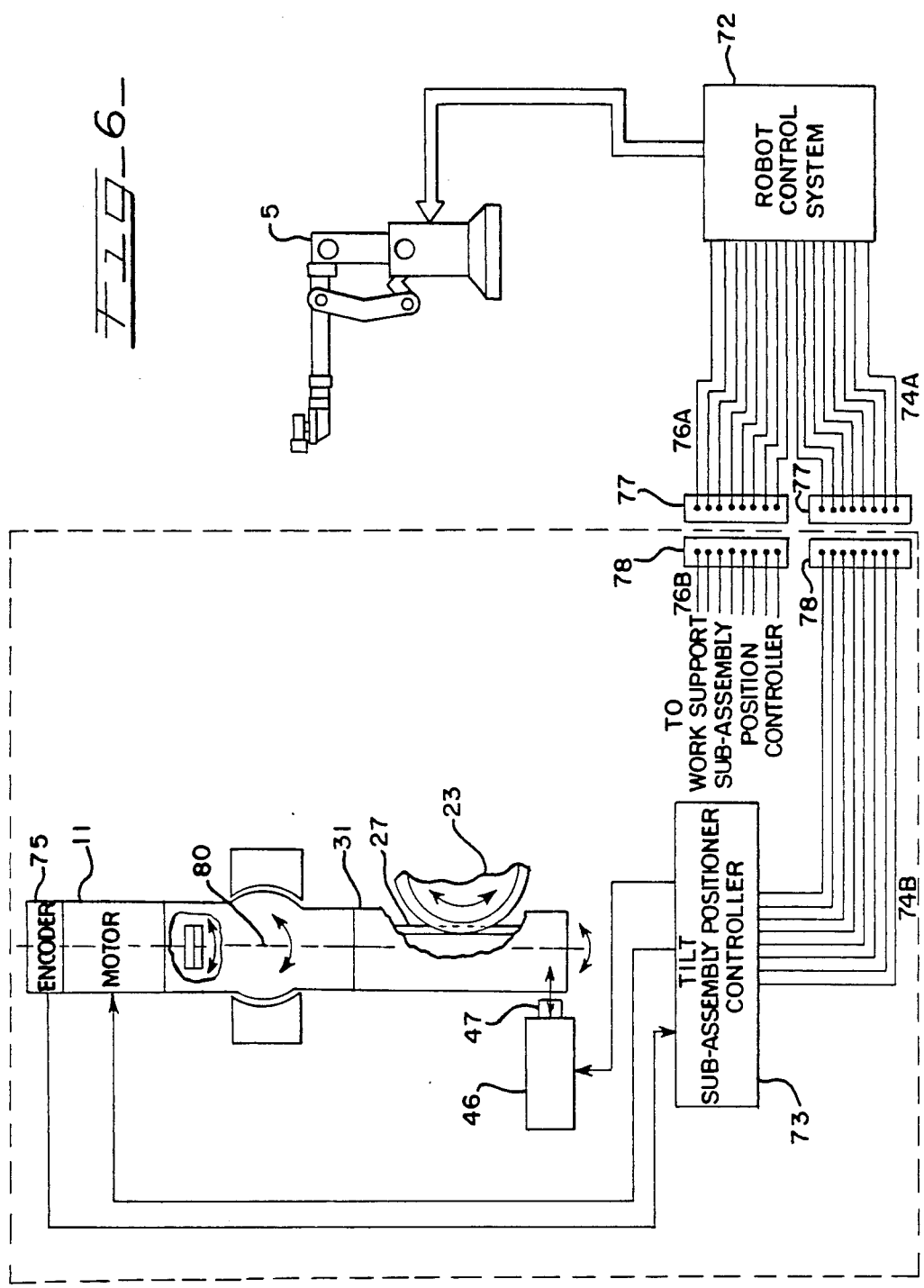

WORK POSITIONER

RELATED APPLICATION

This application is a continuation of U.S. patent application Ser. No. 821,693, filed Jan. 23, 1986, now U.S. Pat. No. 4,653,739.

BACKGROUND OF THE INVENTION

This invention generally relates to a work piece positioning device and more particularly, to a highly accurate work piece positioning device which is used in conjunction with and controlled by an automated system or device such as a robotic welder.

Robotic welders have been used in conjunction with work piece positioning devices which are driven to predetermined desired positions by two drive systems, one of which controls the rotation of the work piece about the x axis and the other of which controls rotation about the y axis. Heretofore, these drive systems have utilized spur gears to produce desired rotation. However, spur gears are relatively inaccurate due to the backlash which is inherent in a spur gear system. Since accuracy is an imporant requirement of a satisfactory positoning device, various expedients for reducing the backlash in spur gear systems have been utilized.

One such expedient involves joining two identical spur gears side-by-side with one gear rotated slightly with respect to the other so that the gear teeth do not line up perfectly. The resulting modified spur gear is then used with an unmodified spur gear with one of the two being driven by the other. This provides a combination which is initially more accurate than two unmodified spur gears in combination. However, this initial improvement in accuracy is not permanent due to increased or excessive wear. Other drives based on spur gears have beenproposed but they also have been subject to excessive wear.

Further, spur gear systems are limited to relatively low gear ratios which inherently are less accurate than gear systems having higher gear ratios in respect to drive motor error.

The object of this invention generally stated is the provision of a work piece positioning device which is particularly useful for accurately positioning work pieces such as work pieces to be welded in predetermined positions or attitudes.

An important object of the invention is the provision of such work piece positioning devices or machines which are adapted to be controlled by a robot for repetitive operation in commercial production.

A further object of the invention is the provision of such a work piece positioning device which incorporates one sub-assembly which is rotatable about an x axis and a second sub-assembly carried by the first sub-assembly which is rotatable about a y axis, with each of the sub-assemblies being independently and separately controlled by separate or independent electric motors which in turn can be controlled by a suitably interconnected and programmed robot.

A further important object of the invention is the provision of such a work piece positioning device wherein the tiltable or rotatable sub-assemblies are rotated or tilted by the action of a worm and worm gear.

Another important object of the invention is the provision of such a work piece positioning device wherein the worm and worm gear drive combinations are adapted to be locked in a desired or predetermined condition by increasing the force beteen the worm and worm gear in excess of that used for driving movement.

Certain other objects of the invention will be obvious and others will be apparent to those skilled in the art from the following detailed description of a presently preferred embodiment of the invention taken in connection with the accompanying drawings wherein:

BRIEF DESCRIPTION OF THE DRAWINGS

FIG. 1 is a perspective view showing a robotic welder in position to weld a work piece mounted on a positioning device constructed in accordance with the invention.

FIG. 2 is a perspective view from the rear of the positioning device shown in FIG. 1.

FIG. 3 is a rear elevation view, of the positioning device shown in FIG. 2 with certain parts removed.

FIG. 6 is a schematic drawing depicting the interconnection between a robotic welder and a work piece positioning device embodying the present invention.

DETAILED DESCRIPTION OF THE PREFERRED EMBODIMENT

Figure 4:
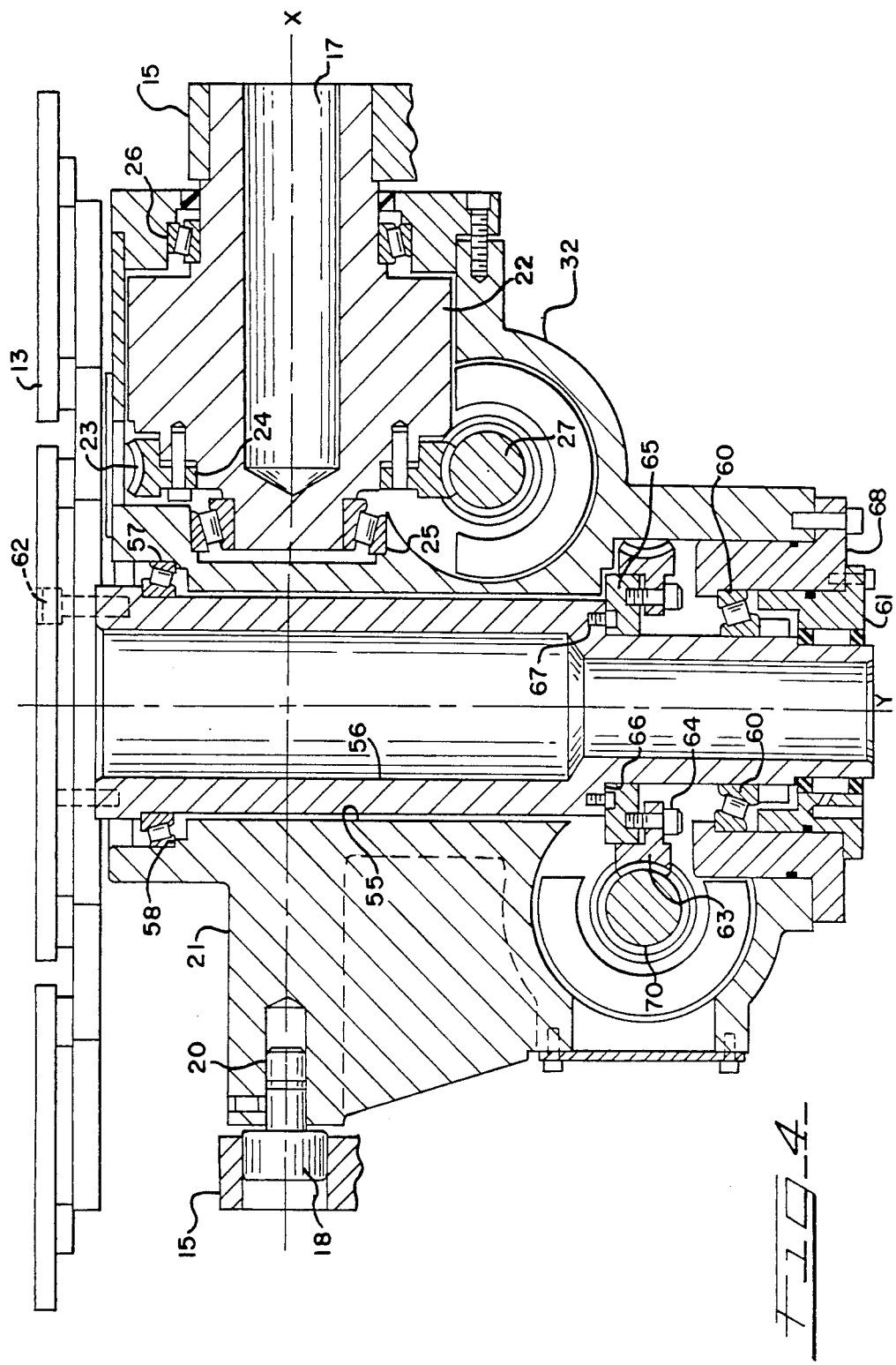
FIG. 4 is a horizontal sectional view taken on line 4—4 of FIG. 3.

Referring to FIG. 1, a robotic welder of known type is indicated generally at 5 in operating position with respect to a positioning device indicated generally at 6 forming one embodiment of the present invention. The positioning device 6 includes a frame indicated generally at 7 with a tilt sub-assembly indicated generally at 8 mounted thereon so as to be tiltable about an x axis (FIG. 4). A work support sub-assembly is indicated generally at 10 mounted on tilt sub-assembly 8 so as to be rotatable about a y axis.

As will be described below, the tilt sub-assembly 8 is actuated and controllably positioned by means of electric motor 11 while the work support sub-assembly 10 is controllably actuated and positioned by an electric motor 12. These motors can be of known commercial type such as AC or DC Servo Controlled Motors.

The work support sub-assembly 10 carries a work support table 13 which is provided with T-shaped retention slots 9—9 in which suitably headed bolts can be slidably positioned for mounting a work piece to be welded which is indicated diagramatically at 14. It will be seen that by actuating the tilt sub-assembly 8 about the x axis and the work support sub-assembly 10 about the y axis, the work support platform 13 and work piece 14 can be placed in any desired predetermined attitude so that the robotic welder 5 can perform the automatic welding operations in a known manner.

The tilt sub-assembly 8 is supported on inclined frame members 15—15 which are mounted in cantilever fashion on the frame uprights 16—16. The right hand member 15 carries a shaft 17 while the left hand member 15 carries a bearing 18 in which is journaled a pin 20 which projects into and supports one side of the main body 21 of the tilt sub-assembly 8.

The x axis is co-axial with the pin 20 and the shaft 17 whereby the tilt sub-assembly 8 is tiltable on the x axis as above mentioned.

Figure 5:
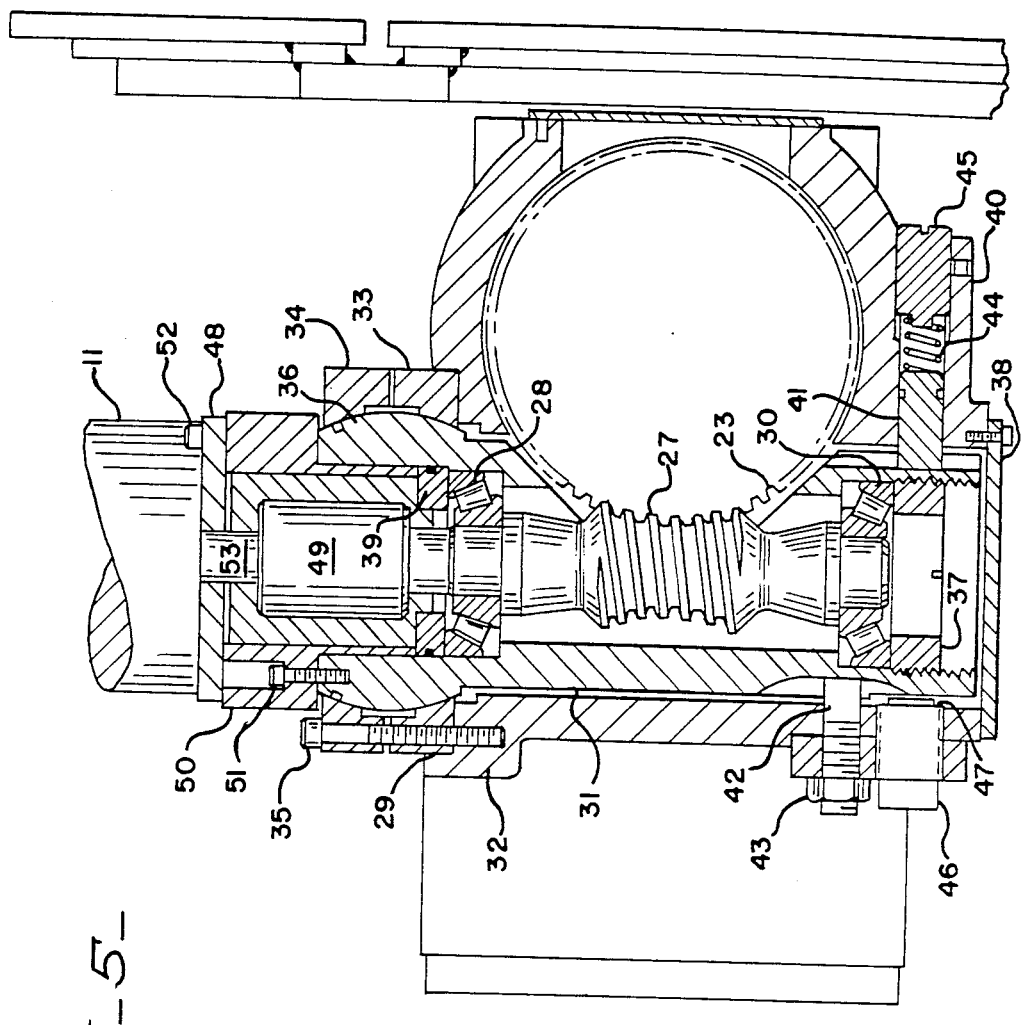
FIG. 5 is a detailed sectional view, on enlarged scale, taken on line 5—5 of FIG. 3.

The shaft 17 supports a stationary hub 22 which carries a fixed worm gear 23 secured to the inner face of the hub by a plurality of bolts 24—24. The side of the body 21 adjacent the hub 22 is supported for rotation or tilting action by a pair of tapered roller bearings indicated at 25 and 26. The worm gear 23 is driven by a worm 27 (FIGS. 4 and 5) which is driven by the motor 11. The worm 27 is supported by upper and lower tapered roller bearings 28 and 30 (FIG. 5) respectively, mounted in a worm housing 31. The housing 31 is supported within the portion of the body 21 which is indicated at 32 (FIGS. 4 and 5).

The body portion 32 is provided with a circular recess 29 in which is seated a collar 33 over which fits a mating collar 34. The collars 33 and 34 are secured together and to the body portion 32 by a plurality of bolts 35. The collars 33 and 34 have inner surfaces which are sections of a sphere for receiving an interfitting ball section 36 integrally formed on the worm housing 31 so that the housing has limited tilting movement within the body portion 32. At its opposite end the worm housing 31 projects through an opening in the body portion 32 which is slightly oversize in respect to the interfitting end of the worm housing 31 so as to permit the limited tilting movement of the worm housing. The worm 27 is secured in place within the worm housing 31 by a nut 37 which is threaded or otherwise secured into the adjcent end of the housing 31. The adjacent opening into body portion 32 is closed by a removable plate 38 which is bolted to an end cap 40.

The worm housing 31 and in turn the worm 27 are positioned with respect to the worm gear 23 by means of diametrically opposed keys 41 and 42. The key 42 is adjustably fixed by a jam nut 43 while the key 41 is spring loaded by a spring 44 backed up by a set screw 45. The adjustability of key 42 controls the clearance between the worm 27 and the worm gear 23 and consequently allows adjustment of the amount of backlash in the gear system.

In operation, when worm 27 is being driven by motor 11, the worm housing 31 will be pressed against the end of the fixed key 42 by the action of the spring 44 on the key 41. When it is desired to lock the worm 27 against the worm gear 23 and secure the tilt sub-assembly 8 in any desired predetermined position, a solenoid energizes a cylinder 46 so as to force a plunger 47 against the worm housing 31 and pivot the same with a desired degree of force producing the desired locking engagement between the worm 27 and the worm gear 23.

The tapered roller bearing 28 is secured in place by a retainer ring 39 which is engaged by the adjacent end of a fitting 50 secured to the worm housing 31 by recessed bolts 51. The mounting plate 48 of the motor 11 is secured on the fitting 50 by a plurality of bolts 52. The motor shaft 53 is coupled to the worm 27 by a coupling 49 of known type.

Work Support Sub-Assembly

As mentioned above, the worm support sub-assembly 10 is rotatably supported on the tilt sub-assembly 8 for rotation about the y axis. Referring to FIG. 4, the body 21 of the tilt sub-assembly 8 is provided with a through-bore 55 which houses a hollow shaft 56. The work support table 13 is mounted and secured onto the large end of the hollow shaft 56 by mean of a plurality of bolts 62. The shaft 56 is journaled at one end in a tapered roller bearing 57 seated in a recess 58 provided therefore at the large end of the bore 55. The opposite end and smaller diameter portion of the shaft 56 is journaled in a tapered roller bearing 60 mounted in the smaller end of the through-bore 55. The bearing 60 is secured by a seal housing 61 and a bearing retainer assembly 68.

A worm gear 63 is secured to a shaft 56 by a plurality of bolts 64—64 through a collar or adapter 65 which is carried by the shaft 56. The collar 65 fits over the smaller end of the shaft 56 and up against a shoulder 66 and is secured in place by a plurality of bolts 67.

The worm gear 66 is driven by a worm 70 which is driven by the reversible electric motor 12. The worm 70 is carried in a worm housing 71 corresponding to worm housing 31. This corresponding worm housing 71 is supported from body 21 in the same manner as the worm housing 31 is supported from the body 21 and is thus, in turn, similarly limited or restricted in its tilting movement. This limited tilting movement of the worm 70 and worm housing 71 is controlled by a pair of opposed keys configured in the same manner as keys 41 and 42. Additionally, the worm 70 can be pressed against the worm gear 63 with a desired force by means of a solenoid actuated cylinder and plunger corresponding to the solenoid actuated cylinder 46 and plunger 47. Likewise, the motor 12 is mounted for driving connection with the worm 70 in the same manner that the motor 31 is mounted for driving the worm 27. Accordingly, for all intent and purposes the worm 70 is mounted, controlled and driven by motor 12 in the same manner that the worm 27 is driven by motor 11.

Operation

The operation of the positioning device 6 is controlled by the actuation of the motors 11 and 12. By energizing the motor 11 and rotating it in the desired direction the desired number of rotations, the tilt sub-assembly 8 will be rotated about the x axis to the desired position. Likewise, the degree of rotation of the work support sub-assembly 10 about the y axis is obtained by energizing the motor 12 so as to rotate the worm 70 in the desired direction and the desired number of rotations or partial rotation thereof. The combination of rotation about the x and y axes places the work piece 14 in the desired attitude to be welded.

Once the work support sub-assembly 10 and tilt sub-assembly 8 have been moved or placed in their desired predetermined positions respectively, it becomes important that they be locked or maintained in these positions until respositioning thereof is desired. This locking function is obtained for the tilt sub-assembly 8 by actuating the solenoid actuated cylinder 46 which in turn urges the plunger 47 to force the worm housing 31 and in turn the worm 27 into locking engagement with the worm gear 23. In the same manner the worm 70 can be locked against the worm gear 63 by actuation of a corresponding solenoid actuated cylinder and plunger (not shown). Since the surfaces of the worms 27 and 70 have substantial areas of engagement with the teeth on the worm gears 23 and 63 respectively, excellent locking action is obtained so that there is virtually no shifting between the worms and their respective worm gears after locking engagement has been obtained. Since locking action is obtained without having to modify or mutilate either the worms or worm gears, they are subject only to normal wear which is negligible.

For certain operations, depending mainly on the size, weight, and the orientation of the work piece 14, it may not be necessary to utilize the locking mechanism in order to maintain the table 13 and the work piece 14 in the desired predetermined attitude. In those instances, it will suffice to rely merely upon the frictional drag between each worm, 27 and 70, and its respective worm gear 23 and 63 in order to prevent movement of each worm relative to its worm gear. As disclosed above, this frictional drag may be controlled by adjusting key 42 and locking it in place with nut 43.

Furthermore, in view of the high gear ratio between the worm gears 23, 63 and the worms 27 and 70 respectively, it will be seen that the tilt sub-assembly 8 and work support sub-assembly 10 can be very accurately positioned by the controlled rotation of the worms 27 and 70. In turn, this accurate positioning of the sub-assemblies 8 and 10 provides accurate positioning of the work piece 14.

The motors 11 and 12 can be controlled in various known ways by known equipment but a preferred system and method of control is depicted in FIG. 6 which utilizes sixteen output signals from the control system 72 of the robotic welder 5. Eight of these signals are used as input signals to a tilt sub-assembly position controller 73 and the other eight are used as input signals to a work support sub-assembly position controller (not shown). The eight signals which specify the amount of tilt desired are transmitted from the robot control system 72 to the tilt sub-assembly controller 73 in known manner through conductors 74A and 74B. The eight signals which specify the amount of rotation desired are transmitted from the robot control system 72 to the work support sub-assembly controller (not shown) in known manner through conductors 76A and 76B. In order to facilitate easy disconnection of the work piece positioning device 6 from the robotic welder 5, it is preferable to use male and female connectors 77 and 78 to connect conductors 74A and 74B and 76A and 76B, respectively.

As shown in FIG. 6, the desired table tilt position is input into the tilt sub-assembly position controller 73. The controller compares the desired position with the extant or current position and determines the number of motor rotations necessary in order to orient the work piece in the desired attitude. Thereupon, a signal is sent from the tilt sub-assembly position controller 73 to the motor 11 causing the motor to rotate, thus causing the entire tilt sub-assembly 18 to tilt. An encoder 75 attached to motor 11 identifies the rotational position of the motor and the controller 73 compares the actual position with the programmed position required to locate the work piece in the desired attitude. As the number of remaining rotations decreases, the controller 73 slows the motor's rotation from its normal operating speed to a relatively slower speed in order to facilitate the accurate positioning of the tilt sub-assembly 8.

After the motor 11 has rotated the desired number of rotations, causing the work support table 13 to tilt the desired predetermined amount, the controller 73 generates a signal which activates cylinder 46 forcing plunger 47 into contact with worm housing 31. This causes worm housing 31, motor 11, encoder 75 and worm 27 to rotate slightly about point 80 and forces the teeth of worm 27 to lock securely with the teeth of worm gear 23. The cylinder 46 remains activated causing the teeth to remain locked until a new desired position is received by the controller at which time the cylinder 46 is deactivated.

Once the worm and worm gear are locked into position, the controller 73 sends a signal to the robot control system 72 which signifies that the work piece 14 has been tilted to the desired position. The work support sub-assembly rotation mechanisms and controller (not shown) thereupon operate in substantially the same manner as the table tilt mechanisms and controller 73. When both the tilt sub-assembly portion controller 73 and the work support sub-assembly position controller have sent signals to the robot control system 72, the robot 5 is then instructed to weld the work piece and does so in a known manner.

The control equipment including the robot controller 72, tilt sub-assembly controller 73 and work support sub-assembly controller is of known commercial type and is programmable to operate in known manner. The following commercially available controllers have been found satisfactory, Allen-Bradley DC, NC, and CNC; as well as G.E., T.I., Cincinnati, and most other similar control types.

What is claimed as new is:

1. A lockable worm and gear drive comprising:
a worm gear having a plurality of gear teeth;
a rotatability mounted worm which forceably and drivingly engages the gear teeth of said worm gear;
means for increasing the force between said worm and said worm gear teeth to provide rigid locking of said worm and worm gear to prevent relative rotation therebetween, and wherein said worm is rotatably mounted in a housing, said housing being tiltably support adjacent one end and having means for tilting said housing to increase the force between said worm and said worm gear teeth;
reciprocable means operatively connected with the end of said worm opposite said tilting means for applying a force to said housing to tilt said housing; and
wherein said reciprocable means comprises a spring-biased pin reciprocably mounted for continuous engagement with one side of said worm housing and a solenoid-actuated cylinder and plunger mounted for engaging the opposite side of said worm housing with sufficient force to cause retraction of spring-biased pin.

2. The worm and gear drive called for in claim 1 wherein said tilting means comprises a ball-shaped section mounted on said housing and socket means for receiving said ball-shaped section.

* * * * *